United States Patent
Hodjat et al.

(10) Patent No.: US 9,256,837 B1
(45) Date of Patent: Feb. 9, 2016

(54) DATA MINING TECHNIQUE WITH SHADOW INDIVIDUALS

(71) Applicant: Sentient Technologies (Barbados) Limited, Belleville (BB)

(72) Inventors: Babak Hodjat, Dublin, CA (US); Hormoz Shahrzad, Dublin, CA (US)

(73) Assignee: SENTIENT TECHNOLOGIES (BARBADOS) LIMITED, Belleville (BB)

( * ) Notice: Subject to any disclaimer, the term of this patent is extended or adjusted under 35 U.S.C. 154(b) by 365 days.

(21) Appl. No.: 13/830,278

(22) Filed: Mar. 14, 2013

(51) Int. Cl.
*G06N 3/12* (2006.01)
*G06N 99/00* (2010.01)

(52) U.S. Cl.
CPC .................................. *G06N 99/005* (2013.01)

(58) Field of Classification Search
CPC ...................................................... G06N 3/12
USPC ........................................................ 706/52
See application file for complete search history.

(56) References Cited

U.S. PATENT DOCUMENTS

| | | | |
|---|---|---|---|
| 8,909,570 | B1 | 12/2014 | Hodjat et al. |
| 2009/0125370 | A1 | 5/2009 | Blondeau et al. |
| 2010/0293119 | A1 | 11/2010 | Ferringer et al. |

OTHER PUBLICATIONS

Hornby, G.S., "A Steady-State Version of the Age-Layered Population Structure EA," Chapter 1 of Genetic Programming Theory and Practice VII, Riolo et al., editors, Springer 2009, 16pp.

Hornby, G.S., "Steady-State ALPS for Real-Valued Problems," GECCO'09, Montreal, Jul. 2009, Assoc. for Computing Machinery, 8pp.

idesign lab, "ALPS—the Age-Layered Population Structure," UC Santa Cruz web article printed Mar. 17, 2011, 3 pp. (http://idesign.ucsc.edu/projects/alps.html).

Hornby, G.S., "ALPS: The Age-Layered Population Structure for Reducing the Problem of Premature Convergence," GECCO'06, Seattle, Jul. 2006, authored by an employee of the US Government, therefore in the public domain, 8pp.

Bongard, J. C. and Hornby, G. S., "Guarding Against Premature Convergence while Accelerating Evolutionary Search", GECCO'10: Proceedings of the 12th annual conference on Genetic and Evolutionary Computation, 8 pages (2010).

Mouret J-B et al., "Encouraging Behavioral Diversity in Evolutionary Robotics: An Empirical Study," MIT, Evolutionary Computation 20(1):91-133, 2012.

(Continued)

*Primary Examiner* — Stanley K Hill
*Assistant Examiner* — Ola Olude Afolabi
(74) *Attorney, Agent, or Firm* — Haynes Beffel & Wolfeld LLP; Warren S. Wolfeld

(57) ABSTRACT

Roughly described, a computer-implemented evolutionary data mining system includes a memory storing a candidate gene database containing active and shadow individuals; a gene pool processor which tests only active individuals on training data and updates their fitness estimates; a competition module which selects individuals (both active and shadow) for discarding from the gene pool in dependence upon both their updated fitness estimate and their testing experience level; and a gene harvesting module providing for deployment selected ones of the individuals from the gene pool. The gene database has an experience layered elitist pool, and individuals to compete only with other individuals in their same layer. Shadow individuals are created in each layer for active individuals that survive all competition with the layer before their testing experience exceeds the testing experience range for the layer.

28 Claims, 9 Drawing Sheets

(56) References Cited

OTHER PUBLICATIONS

Refaeilzadeh P, et al., "Cross Validation" entry, Encyclopedia of Database Systems, eds. Özsu and Liu, Springer, 2009, 6pp.

Laumanns, Marco et al.; "A Unified Model for Multi-Objective Evolutionary Algorithms with Elitism"; 2000; IEEE; pp. 46-53.

Ahn, Chang Wook et al.; "Elitism-Based Compact Genetic Algorithms"; 2003; IEEE; Transactions on Evolutionary Computation, vol. 7, No. 4; pp. 367-385.

ACTIVE INDIVIDUAL

| | INDIVIDUAL ID (312) | EXPERIENCE (314) | FITNESS (316) | | (322) |
|---|---|---|---|---|---|
| RULE 1 | P/V 1.1 | P/V 1.2 | ... | P/V 1.M | OUTPUT 1 |
| RULE 2 | P/V 2.1 | P/V 2.2 | ... | P/V 2.M | OUTPUT 2 |
| RULE 3 | P/V 3.1 | P/V 3.2 | ... | P/V 3.M | OUTPUT 3 |
| RULE 4 | P/V 4.1 | P/V 4.2 | ... | P/V 4.M | OUTPUT 4 |
| RULE 5 | P/V 5.1 | P/V 5.2 | ... | P/V 5.M | OUTPUT 5 |

FIG. 3

SHADOW INDIVIDUAL (330)

| INDIVIDUAL ID (332) | EXPERIENCE (334) | FITNESS (336) |
|---|---|---|

FIG. 3A

DATA MINING TECHNIQUE WITH SHADOW INDIVIDUALS

CROSS-REFERENCE TO OTHER APPLICATIONS

The following patent applications are incorporated herein for their teachings: U.S. patent application Ser. No. 13/184,307, filed 15 Jul. 2011, entitled "DATA MINING TECHNIQUE WITH EXPERIENCE-LAYERED GENE POOL"; U.S. patent application Ser. No. 13/358,381, filed 25 Jan. 2012, entitled "DATA MINING TECHNIQUE WITH MAINTENANCE OF FITNESS HISTORY"; and U.S. patent application Ser. No. 13/540,507, filed 2 Jul. 2012, entitled "DATA MINING TECHNIQUE WITH DIVERSITY PROMOTION".

BACKGROUND

The invention relates generally to data mining, and more particularly, to the use of genetic algorithms to extract useful rules or relationships from a data set for use in controlling systems.

In many environments, a large amount of data can be or has been collected which records experience over time within the environment. For example, a healthcare environment may record clinical data, diagnoses and treatment regimens for a large number of patients, as well as outcomes. A business environment may record customer information such as who they are and what they do, and their browsing and purchasing histories. A computer security environment may record a large number of software code examples that have been found to be malicious. A financial asset trading environment may record historical price trends and related statistics about numerous financial assets (e.g., securities, indices, currencies) over a long period of time. Despite the large quantities of such data, or perhaps because of it, deriving useful knowledge from such data stores can be a daunting task.

The process of extracting patterns from such data sets is known as data mining. Many techniques have been applied to the problem, but the present discussion concerns a class of techniques known as genetic algorithms. Genetic algorithms have been applied to all of the above-mentioned environments. With respect to stock categorization, for example, according to one theory, at any given time, 5% of stocks follow a trend. Genetic algorithms are thus sometimes used, with some success, to categorize a stock as following or not following a trend.

Evolutionary algorithms, which are supersets of Genetic Algorithms, are good at traversing chaotic search spaces. According to Koza, J. R., "Genetic Programming: On the Programming of Computers by Means of Natural Selection", MIT Press (1992), incorporated by reference herein, an evolutionary algorithm can be used to evolve complete programs in declarative notation. The basic elements of an evolutionary algorithm are an environment, a model for a genotype (referred to herein as an "individual"), a fitness function, and a procreation function. An environment may be a model of any problem statement. An individual may be defined by a set of rules governing its behavior within the environment. A rule may be a list of conditions followed by an action to be performed in the environment. A fitness function may be defined by the degree to which an evolving rule set is successfully negotiating the environment. A fitness function is thus used for evaluating the fitness of each individual in the environment. A procreation function generates new individuals by mixing rules with the fittest of the parent individuals. In each generation, a new population of individuals is created.

At the start of the evolutionary process, individuals constituting the initial population are created randomly, by putting together the building blocks, or alphabets, that form an individual. In genetic programming, the alphabets are a set of conditions and actions making up rules governing the behavior of the individual within the environment. Once a population is established, it is evaluated using the fitness function. Individuals with the highest fitness are then used to create the next generation in a process called procreation. Through procreation, rules of parent individuals are mixed, and sometimes mutated (i.e., a random change is made in a rule) to create a new rule set. This new rule set is then assigned to a child individual that will be a member of the new generation. In some incarnations, known as elitist methods, the fittest members of the previous generation, called elitists, are also preserved into the next generation.

A common problem with evolutionary algorithms is that of premature convergence: after some number of evaluations the population converges to local optima and no further improvements are made no matter how much longer the algorithm is run. A number of solutions to the problem have been proposed. In one solution, convergence is slowed by increasing the mutation rate, mutation size or population size. Other solutions involve modifying the replacement strategy, modifying the fitness of individuals based on similarity to each other, and by spatially distributing individuals and restricting them to interact only with spatial neighbors. In yet another solution, known as the Age-Layered Population Structure (ALPS), an individual's age is used to restrict competition and breeding between individuals in the population. In the parlance of ALPS, "age" is a measure of the number of times that an individual's genetic material has survived a generation (i.e., the number of times it has been preserved due to being selected into the elitist pool). All of these techniques have benefits and detriments, and may or may not work well in a data mining environment.

SUMMARY

In the above-incorporated "DATA MINING TECHNIQUE WITH EXPERIENCE-LAYERED GENE POOL" application, roughly described, a computer-implemented evolutionary data mining system includes a memory storing a candidate gene database in which each candidate individual has a respective fitness estimate; a gene pool processor which tests individuals from the candidate gene pool on training data and updates the fitness estimate associated with the individuals in dependence upon the tests; and a gene harvesting module providing for deployment selected ones of the individuals from the gene pool, wherein the gene pool processor includes a competition module which selects individuals for discarding from the gene pool in dependence upon both their updated fitness estimate and their testing experience level. Preferably the gene database has an elitist pool containing multiple experience layers, and the competition module causes individuals to compete only with other individuals in their same experience layer.

Applicants have recognized, however, that in some circumstances it is possible for a relatively less fit individual to enter the elitist pool and soon graduate to the next higher layer, only because the more fit individuals in the destination layer are themselves graduating out of that layer. In this way it is possible for a relatively less fit individual to remain in the candidate gene database and work its way all the way up to the top layer, at which point it is finally discarded. It can be a waste of scarce resources to continue testing individuals that will eventually be eliminated.

In order to address this type of situation, roughly described, a system can be arranged to remember, in conjunction with each testing experience layer, the fitness estimates of the individuals that have survived the competitions in a particular layer for long enough that their testing experience level has now qualified them for a higher layer. These so-called shadow individuals remain involved in the fitness competitions among individuals in or entering the particular layer, until they themselves are eliminated by the competition. However, they no longer receive testing in the particular layer.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which:

FIG. 3 is a symbolic drawing of an active individual in either the candidate gene pool or the production gene population of FIG. 1.

FIG. 3A is a symbolic drawing of a shadow individual in the candidate gene pool of FIG. 1.

DETAILED DESCRIPTION

Figure 1:
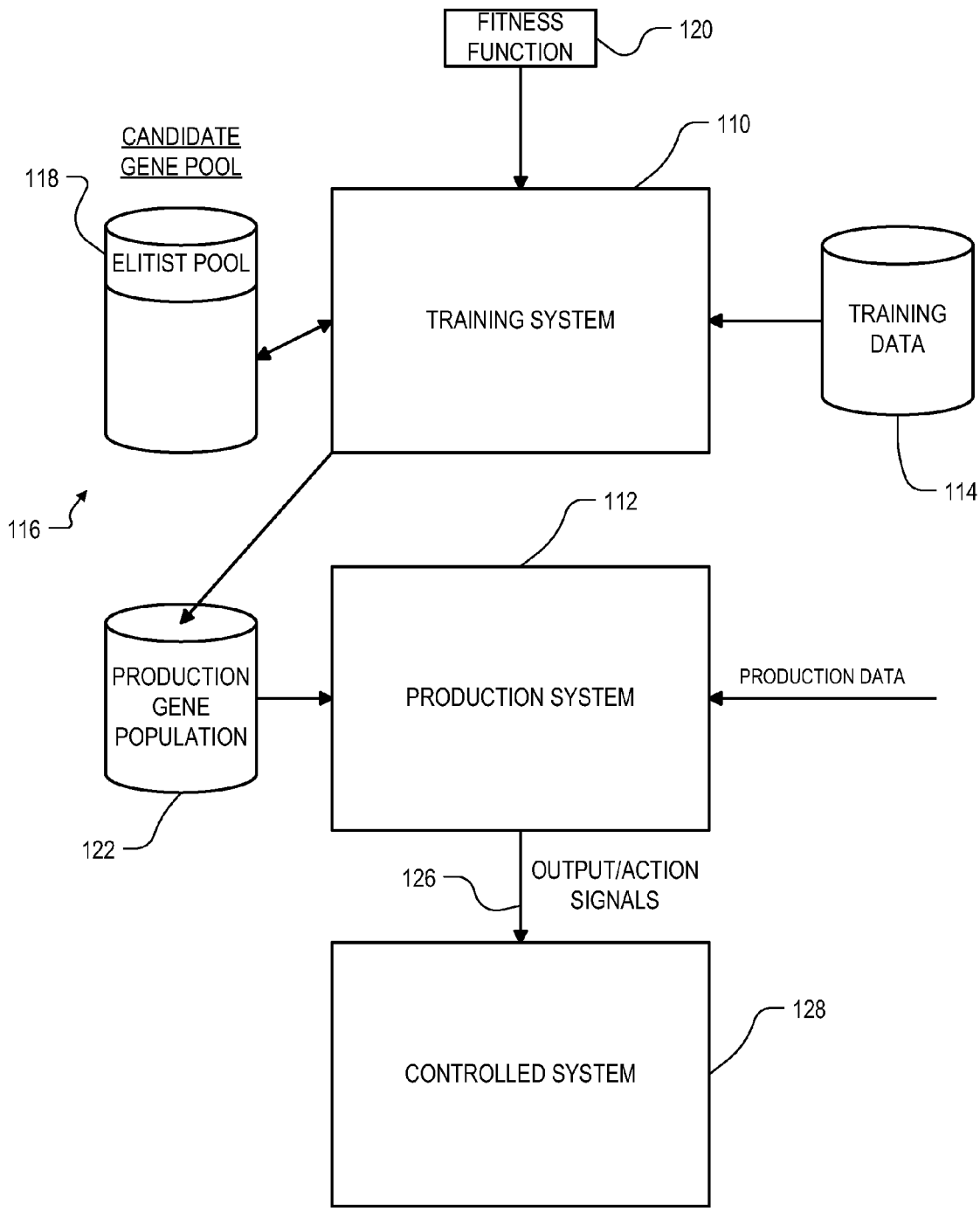
FIG. 1 is an overall diagram of an embodiment of a data mining system incorporating features of the invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Data mining involves searching for patterns in a database. The fittest individuals are considered to be those that identify patterns in the database that optimize for some result. In embodiments herein, the database is a training database, and the result is also represented in some way in the database. Once fit individuals have been identified, they can be used to identify patterns in production data which are likely to produce the desired result. In a healthcare environment, the individual can be used to point out patterns in diagnosis and treatment data which should be studied more closely as likely either improving or degrading a patient's diagnosis. In a financial assets trading environment, the individual can be used to detect patterns in real time data and assert trading signals to a trading desk. The action signals from an individual can be transmitted to the appropriate controlled system for execution.

One difference between the data mining environments of the embodiments described herein, and many other environments in which evolutionary algorithms can be applied, is that the fitness of a particular individual in the data mining environment usually cannot be determined by a single test of the individual on the data; rather, the fitness estimation itself tends to vary as it is tested on more and more samples in the training database. The fitness estimate can be inaccurate as testing begins, and confidence in its accuracy increases as testing on more samples continues. This means that if an individual is "lucky" early on, in the sense that the first set of samples that it was given for testing happened to have been in some sense "easy", then after only the first set of samples the individual will appear to be fitter than it actually is. If compared to other individuals that have much more experience, lucky individuals could displace individuals whose fitness estimates are lower but more realistic. If care is not taken, therefore, the algorithm will optimize for individuals that are lucky early on, rather than their actual fitness.

A solution to this problem is to consider individuals for the elitist pool only after they have completed testing on a predetermined number of samples, for example 1000 samples. Once an individual has reached that minimum threshold experience level, comparisons with other individuals are considered valid and can compete on the basis of fitness for a place in the elitist pool.

However, the argument that high fitness values of individuals with less experience and could be due to luck rather than true fitness, also applies, though to a lesser degree, even to individuals within the elitist pool. That is, if compared to other individuals that have much more experience, younger, luckier individuals that have already entered the elitist pool could still displace individuals whose fitness levels are lower but more realistic. Again, allowing such individuals to compete against each other solely on the basis of fitness would continue to optimize for individuals that are lucky. The same solution can be applied to avoid this problem: divide the elitist pool into two layers on the basis of experience level. For example, layer 1 ($L_1$) may include only those individuals that have been tested on 1000-1999 samples, while a layer 2 ($L_2$) includes all individuals that have been tested on 2000 or more samples. Individuals compete only against other individuals within the same experience layer.

It will be appreciated that the tendency to optimize for lucky individuals still remains, within each layer, though to a still lesser degree. A solution is again the same: add more layers until the tendency to optimize for lucky individuals is reduced to a level sufficiently small for the particular application. In the extreme, each layer contains only those individuals having a single experience level, meaning only individuals that have been tested on exactly the same number of samples can compete against each other. This extreme may not be practical, however, as it can require a large amount of memory to maintain. Thus for a particular application, there will be an appropriate number of layers which minimizes the tendency to optimize for lucky individuals, yet remains practical to implement.

In general, in embodiments herein, the elitist pool contains T layers numbered $L_1$-$L_T$, with T>1. The overall pool of candidate individuals also includes some that have not yet undergone sufficient numbers of tests to be considered for the elitist pool, and those individuals are considered herein to reside in a layer below the elitist pool, designed layer 0 ($L_0$). Each i'th one of the layers in $[L_0 \ldots L_{T-1}]$ contains only individuals with a respective range of testing experience $[ExpMin(L_i) \ldots ExpMax(L_i)]$, each $ExpMin(L_{i+1})$>$ExpMax(L_i)$. The minimum experience level of the bottom layer $L_0$ is 0, and the top layer $L_T$ has a minimum experience level $ExpMin(L_T)$ but no maximum experience level. Preferably, the experience ranges of contiguous layers are themselves contiguous, so that $ExpMin(L_{i+1})$=$ExpMax(L_i)$+1, for 0<=i<T. As used herein, if an individual is said herein to be "in" a particular layer, this is merely a shortcut way of saying that its testing experience level is within the range of testing experience levels of the particular layer.

Note that testing experience level is a significantly different basis on which to stratify individuals in an elitist pool than age in the sense of ALPS.

In an embodiment, each layer i in the elitist pool (i.e. in layers $[L_1 \ldots L_T]$) is permitted to hold a respective maximum number of individuals, $Quota(L_i)$. The quota is chosen to be small enough to ensure competition among the individuals within the corresponding range of experience levels, but large enough to ensure sufficient diversity among the fit individuals that graduate to the next higher layer. The quotas for all the layers may or may not be equal in different embodiments. Preferably the quota of each particular layer is fixed, but in another embodiment it could vary over time. The quota of layer $L_0$ is not chosen based on these criteria, since the individuals in that layer do not yet compete. Preferably the number of layers T in the elitist pool is also fixed, but in another embodiment it can vary.

As each individual gains more experience, assuming it is not displaced within its current experience layer, it will eventually be eligible to compete for entry into the next higher experience layer. In one embodiment, competition involves comparing the fitness estimate of the incoming individual to that of the least fit individual in the target experience layer. Whichever individual is less fit is discarded and the other is retained in the target layer. (See the above-incorporated DATA MINING TECHNIQUE WITH EXPERIENCE-LAYERED GENE POOL application.) In another embodiment, diversity of the gene pool is taken into account as well in the competition. (See the above-incorporated DATA MINING TECHNIQUE WITH DIVERSITY PROMOTION application.)

Either way, a space is opened in the current experience layer (the layer from which the individual is graduating). The open space means that the next individual graduating into the current experience layer from below may be accepted without having to compete for its place—thereby defeating a purpose of the elitist pool. To mitigate this problem, whenever an individual graduates from a current layer into the next higher layer, the fitness estimate of the individual is retained in the current layer and remains available for use in the competition for entry into the current layer. In an embodiment, the fitness estimate of the individual is retained in the form of a "shadow copy" of the graduating individual. Shadow copies are referred to as such herein because they do not undergo testing as do the active individuals in a layer. Because they do not undergo further testing, it is not necessary to retain a shadow individual's rule set. Only its identification and its fitness estimate are retained in the current layer in some embodiments, although in other embodiments the rule sets are retained as well.

In one embodiment, shadow copies are retained regardless of the fate of the corresponding active individual upon entry into the higher layer. In other embodiments, on the other hand, a shadow copy is not created if the corresponding active individual is promptly discarded due to competition on entry into the higher layer.

The above above-incorporated DATA MINING TECHNIQUE WITH EXPERIENCE-LAYERED GENE POOL application describes an elitist pool minimum fitness, which can be enforced as another way to address the problem that individuals may graduate into the current layer without competition. In one embodiment of the present invention, such an elitist pool minimum fitness may be enforced alongside the use of shadow copy individuals. In another embodiment, the elitist pool minimum fitness can be omitted.

In one embodiment, individuals are harvested from the entire elitist pool for use against production data. In another embodiment, only individuals that have reached the top layer are subject to harvesting. In either embodiment, further selection criteria can be applied in the harvesting process. Such criteria is usually specific to the application environment, and can include, for example, fitness, consistency, and so on.

Example Embodiment

FIG. 1 is an overall diagram of an embodiment of a data mining system incorporating features of the invention. The system is divided into three portions, a training system 110, a production system 112, and a controlled system 128. The training system 110 interacts with a database 114 containing training data, as well as with another database 116 containing the candidate gene pool. As used herein, the term "database" does not necessarily imply any unity of structure. For example, two or more separate databases, when considered together, still constitute a "database" as that term is used herein. The candidate gene pool database 116 includes a portion 118 containing the elitist pool. The training system 110 operates according to a fitness function 120, which indicates to the training system 110 how to measure the fitness of an individual. The training system 110 optimizes for individuals that have the greatest fitness, however fitness is defined by the fitness function 120. The fitness function is specific to the environment and goals of the particular application. For example, the fitness function may be a function of the predictive value of the individual as assessed against the training data—the more often the individual correctly predicts the result represented in the training data, the more fit the individual is considered. In a financial asset trading environment, an individual might provide trading signals (e.g. buy, sell, hold current position, exit current position), and fitness may be measured by the individual's ability to make a profit, or the ability to do so while maintaining stability, or some other desired property. In the healthcare domain, an individual might propose a diagnosis based on patient prior treatment and current vital signs, and fitness may be measured by the accuracy of that diagnosis as represented in the training data. As used herein, fitness may also include other target characteristics, such as diversity of candidate individuals.

The production system 112 operates according to a production gene population in another database 122. The production system 112 applies these individuals to production data 124, and produces outputs 126, which may be action signals or recommendations. In the financial asset trading environment, for example, the production data 124 may be a stream of real time stock prices and the outputs 126 of the production system 112 may be the trading signals or instructions that one or more of the individuals in production gene population 122 outputs in response to the production data 124. In the healthcare domain, the production data 124 may be current patient data, and the outputs 126 of the production system 112 may be a suggested diagnosis or treatment regimen that one or more of the individuals in production gene population 122 outputs in response to the production data 124. The production gene population 122 is harvested from the training system 110 once or at intervals, depending on the embodiment. Preferably, only individuals from elitist pool 118 are permitted to be harvested. In an embodiment, further selection criteria is applied in the harvesting process.

The controlled system 128 is a system that is controlled automatically by the signals 126 from the production system. In the financial asset trading environment, for example, the controlled system may be a fully automated brokerage system which receives the trading signals via a computer network (not shown) and takes the indicated action. Depending on the application environment, the controlled system 128 may also include mechanical systems such as a engines, air-conditioners, refrigerators, electric motors, robots, milling equipment, construction equipment, or a manufacturing plant.

Figure 2:
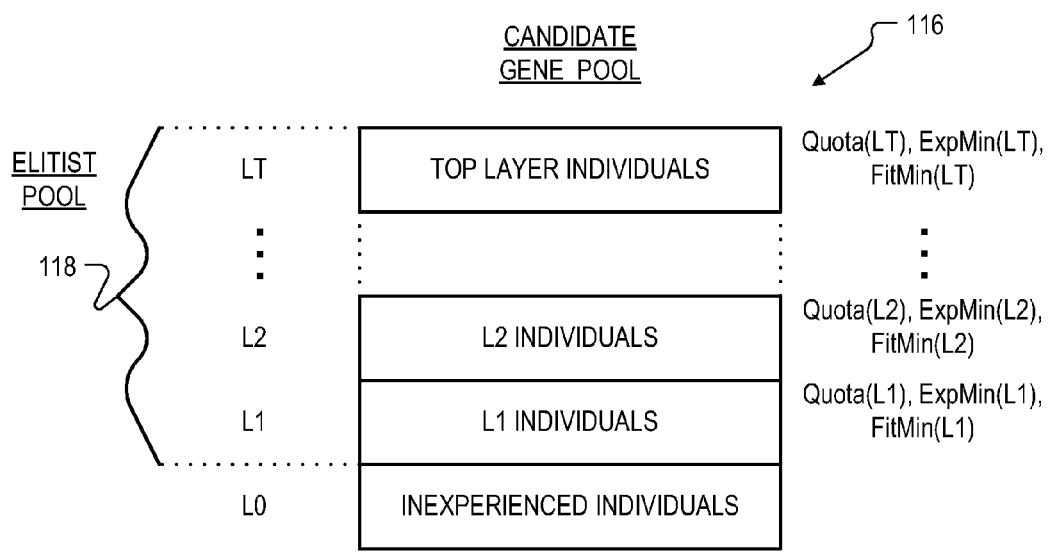
FIG. 2 is a symbolic drawing of the candidate gene pool in FIG. 1.

FIG. 2 is a symbolic drawing of the candidate gene pool 116 in FIG. 1. As can be seen, the individuals in the pool are stratified into T+1 "experience layers", labeled $L_0$ through $L_T$. The individuals in $L_0$ are very inexperienced (have been tested on only a relatively small number of samples in training data 114, if any), whereas the higher layers contain individuals in successively greater experience ranges. The individuals in all layers include "active" individuals as described further below. The individuals in layers $L_1$ through $L_{(T-1)}$ also can contain "shadow" individuals, as described further below. In an embodiment, layer $L_0$ also can contain shadow individuals, but not layer $L_T$. The layers $L_1$ through $L_T$ constitute the elitist pool 118 (FIG. 1). Each layer i in the elitist pool 118 has associated therewith three "layer parameters": a quota Quota ($L_i$) for the layer, a range of experience levels [ExpMin($L_i$) ... ExpMax($L_i$)] for the layer, and the minimum fitness FitMin($L_i$) for the layer. For example, an embodiment in the financial asset trading environment may have on the order of 40 or 50 layers in the elitist pool, each containing individuals with experience levels within a range on the order of 4000-5000 trials. The minimum experience level ExpMin ($L_1$) may be on the order of 8000-10,000 trials, and each layer may have a quota on the order of 100 individuals.

In the embodiment of FIG. 2, the quotas for all the layers in the elitist pool 118 are equal and fixed. Neither is required in another embodiment. In one embodiment, the quotas are larger in the lower layers and progressively decrease for higher layers. In addition, ExpMin($L_0$)=0 in this embodiment. Also, as the experience ranges of the layers are contiguous, ExpMin of each layer can be inferred as one higher than ExpMax of the next lower layer, or ExpMax of each layer can be inferred as one lower than ExpMin of the next higher layer. Thus only the minimum experience level or the maximum experience level need be specified for each layer. In the embodiment, only the minimum experience levels are specified, and they are specified for layers $L_1$-$L_T$; in another embodiment only the maximum experience levels are specified, and they are specified for layers $L_0$-$L_{T-1}$. In yet another embodiment, the size of the range of experience layers assigned to all the layers is constant, and only one minimum or maximum experience level is specified in the layer parameters; the remainder are calculated algorithmically as needed. Other variations will be apparent.

The FitMin( ) values in FIG. 2 are not specified a priori. Rather, they are filled by copying from the fitness estimate associated with the least fit individual in each layer. Whenever the fitness estimate of the least fit individual is updated, and whenever the least fit individual itself is replaced, the FitMin( ) value associated with the layer is updated correspondingly. The FitMin( ) values are needed for comparing to the fitness estimation of individuals coming up from the next lower layer, and having them associated directly with each layer can simplify this comparison. In another embodiment, each layer can instead contain a pointer to the least fit individual in the layer, and the comparison method can obtain the layer minimum fitness from that individual itself. In general, each layer has associated with it an "indication" of the minimum fitness in the layer. As used herein, an "indication" of an item of information does not necessarily require the direct specification of that item of information. Information can be "indicated" in a field by simply referring to the actual information through one or more layers of indirection, or by identifying one or more items of different information which are together sufficient to determine the actual item of information. In addition, the term "identification" and its variants are used herein to mean the same as "indication".

In one embodiment, the experience layers in candidate gene pool 116 define separate regions of memory, and the individuals having experience levels within the range of each particular layer are stored physically within that layer. Preferably, however, the experience layers are only implied by the layer parameters and the individuals can actually be located anywhere in memory. In one embodiment, the individuals in candidate gene pool 116 are stored and managed by conventional database management systems (DBMS), and are accessed using SQL statements. Thus a conventional SQL query can be used to obtain, for example, the fitness estimate of the least fit individual in the highest layer. New individuals can be inserted into the candidate gene pool 116 using the SQL "insert" statement, and individuals being discarded can be deleted using the SQL "delete" statement. In another embodiment, the individuals in candidate gene pool 116 are stored in a linked list. In such an embodiment insertion of a new individual can be accomplished by writing its contents into an element in a free list, and then linking the element into the main linked list. Discarding of individuals involves unlinking them from the main linked list and re-linking them into the free list.

FIG. 3 is a symbolic drawing of an active individual 310 in either the candidate gene pool 116 or the production gene population 122. As used herein, an "individual" is defined by its contents. An individual created by procreation is considered herein to constitute a different individual than its parents, even though it retains some if its parents' genetic material. In this embodiment, the individual identifies an ID 312, its experience level 314, and its current fitness estimate 316. It also includes one or more "rules" 318, each of which contains one or more conditions 320 and an output 322 to be asserted if all the conditions in a given sample are true. During procreation, any of the conditions or any of the outputs may be altered, or even entire rules may be replaced. The individual's experience level 314 increments by one for each sample of the training data 114 on which it is tested, and its fitness estimate 316 is determined by fitness function 120, averaged (or otherwise combined) over the all the trials.

A rule is a conjunctive list of indicator-based conditions in association with an output. Indicators are the system inputs that can be fed to a condition. These indicators are represented in the training database 114, as well as in the production data 124. Indicators can also be introspective, for example by indicating the fitness estimate of the individual at any given moment. In the embodiment of FIG. 1, the individual's conditions are all specified as parameter/value ("P/V") pairs. That is, if in the current sample, the specified parameter has the specified value (or range of values), then the condition is true. Another embodiment can also include conditions which are themselves conditioned on other items (such as other conditions in the rule or in a different rule or the result of another entire one of the rules). Yet another embodiment can also include conditions or rules which are specified procedurally rather than as P/V pairs. Many other variations will be apparent.

In a financial asset trading embodiment, during training, an individual can be thought of as a virtual trader that is given a hypothetical sum of money to trade using historical data. Such trades are performed in accordance with a set of rules that define the individual thereby prompting it to buy, sell, hold its position, or exit its position. The outputs of the rules are trading action signals or instructions, such as buy, sell, exit or hold. Rules may also be designed to contain gain-goal and stop-loss targets, thus rendering the exit action redundant. A hold occurs when no rule in the individual is triggered, therefore, the individual effectively holds its current position. The indicators on which the rules are based can be, for example, a time increment ("tick"), or the closing price for a stock day.

The following code defines an example rule in terms of conditions and indicators, as well as the action asserted by the rule, in accordance with one embodiment of the present invention:

if (PositionProfit>=2% and !(tick=(−54/10000)% prev tick and MACD is negative)
  and !(tick=(−119/10000)% prev tick and Position is long))
  and !(ADX×100<=5052))
  then SELL where "and" represents logical "AND" operation, "!" represents logical "NOT" operation, "tick", "MACD" and "ADX" are stock indicators, "SELL" represents action to sell, and "PositionProfit" represents the profit position of the individual.

In a healthcare embodiment, an individual can be thought of as a set of rules predicting a patient's future state, given the patient's current and past state. The outputs of the rules can be proposed diagnoses or proposed treatment regimens that the individual asserts are appropriate given the conditions of the individual's rules. The indicators on which the rules are based can be a patient's vital signs, and past treatment and medication history, for example. An example rule is as follows:

if pulse>=120 and 18<=blood pressure[6]<20 and temp>=104 and surgery duration<22 and clamp on artery and medication=EB45 and last medication>=60 and !white blood cell count [3]<−2.3 and !oxygen level [1]<−1.1→>>
  then thromboembolism @ prob<=0.65

The candidate gene pool 116 can also contain so-called shadow individuals, which are copies of individuals that have experienced sufficient testing to have qualified for a higher layer. Shadow individuals remain involved in the competition for new entrants into their layer, and are counted toward the layer's quota. They thereby mitigate the problem described above of some individuals graduating into a next layer without competition because the target layer is under quota. However, shadow individuals do not undergo further testing as do the active individuals in a layer. Because they do not undergo further testing, it is not necessary to retain a shadow individual's rule set. Thus in one embodiment, shadow individuals have the same structure as that shown in FIG. 3 for active individuals. FIG. 3A shows another embodiment, in which the rules are eliminated, leaving only the individual ID 332, the individual's experience level 334, and the individual's fitness estimate 336. In yet another embodiment, even the individual ID 332 can be eliminated. The shadow individuals thus do not necessarily even need to retain a record of the active individual from which they were formed. In some embodiments, they can even be stored as merely a separate list of shadow fitness estimates for each layer. As used herein, this is merely an alternative way of identifying the shadow individuals that are associated with each layer.

In an embodiment in which shadow individuals are assigned an actual experience level, typically the experience level assigned to each new shadow individual is merely copied from the version of the corresponding active individual from just prior to the battery of tests that qualified it for the next higher experience layer. In other embodiments, however, it could be any experience level that is within the testing experience range of the layer that the corresponding active individual has graduated from. In yet another embodiment, it could be merely the layer number that the corresponding active individual has graduated from. In general, any indication of the layer that the corresponding active individual has graduated from can be used to indicate the experience level of a shadow individual.

The fitness estimate assigned to a newly formed shadow individual preferably is a copy of the fitness estimate that had been associated with the corresponding active individual before the most recent battery of tests. In another embodiment, however, another fitness estimate can be assigned such as the fitness estimate of the corresponding active individual after the most recent battery of tests. Also, because shadow individuals do not undergo further testing, their fitness estimates are not subsequently changed. In another embodiment, however, the fitness estimate can be updated in parallel with subsequent updating of the fitness estimate of the corresponding active individual, and/or the shadow individual can be discarded if the corresponding active individual is discarded through competition.

Returning to FIG. 1, the training data in the database 114 is arranged as a set of samples, each with parameters and their values, as well as sufficient information to determine a result that can be compared with an assertion made by an individual on the values in the sample. In one embodiment, the result is explicit, for example a number set out explicitly in association with the sample. In such an embodiment, the fitness function can be dependent upon the number of samples for which the individual's output matches the result of the sample. In another embodiment, such as in the financial asset trading embodiment, the result may be only implicit. For example, the sample may include the price of an asset at each tick throughout a trading day, and the training system 110 must hypothetically perform all the trading recommendations made by the individual throughout the trading day in order to determine whether and to what extent the individual made a profit or loss. The fitness function can be dependent upon the profit or loss that the individual, as a hypothetical trader, would have made using the tick data for the sample.

Figure 4:
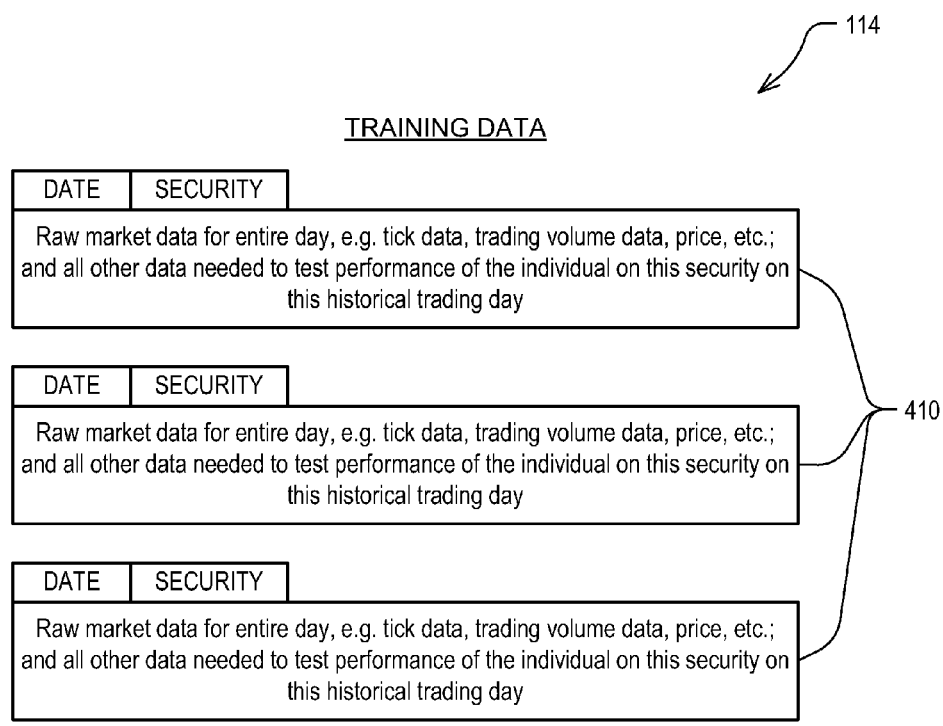
FIG. 4 is a symbolic drawing indicating how the training data database is organized.

FIG. 4 is a symbolic drawing indicating how the training data is organized in the database 114 in one embodiment. The illustration in FIG. 4 is for the financial asset trading embodiment, and it will be understood how it can be modified for use in other environments. Referring to FIG. 4, three samples 410 are shown. Each sample includes a historical date, an identification of a particular security or other financial asset (such as a particular stock symbol), and raw historical market data for that financial asset on that entire trading day, e.g. tick data, trading volume data, price, etc.; and all other data needed to test performance of the individual's trading recommendations on this asset on this historical trading day.

Figure 5:
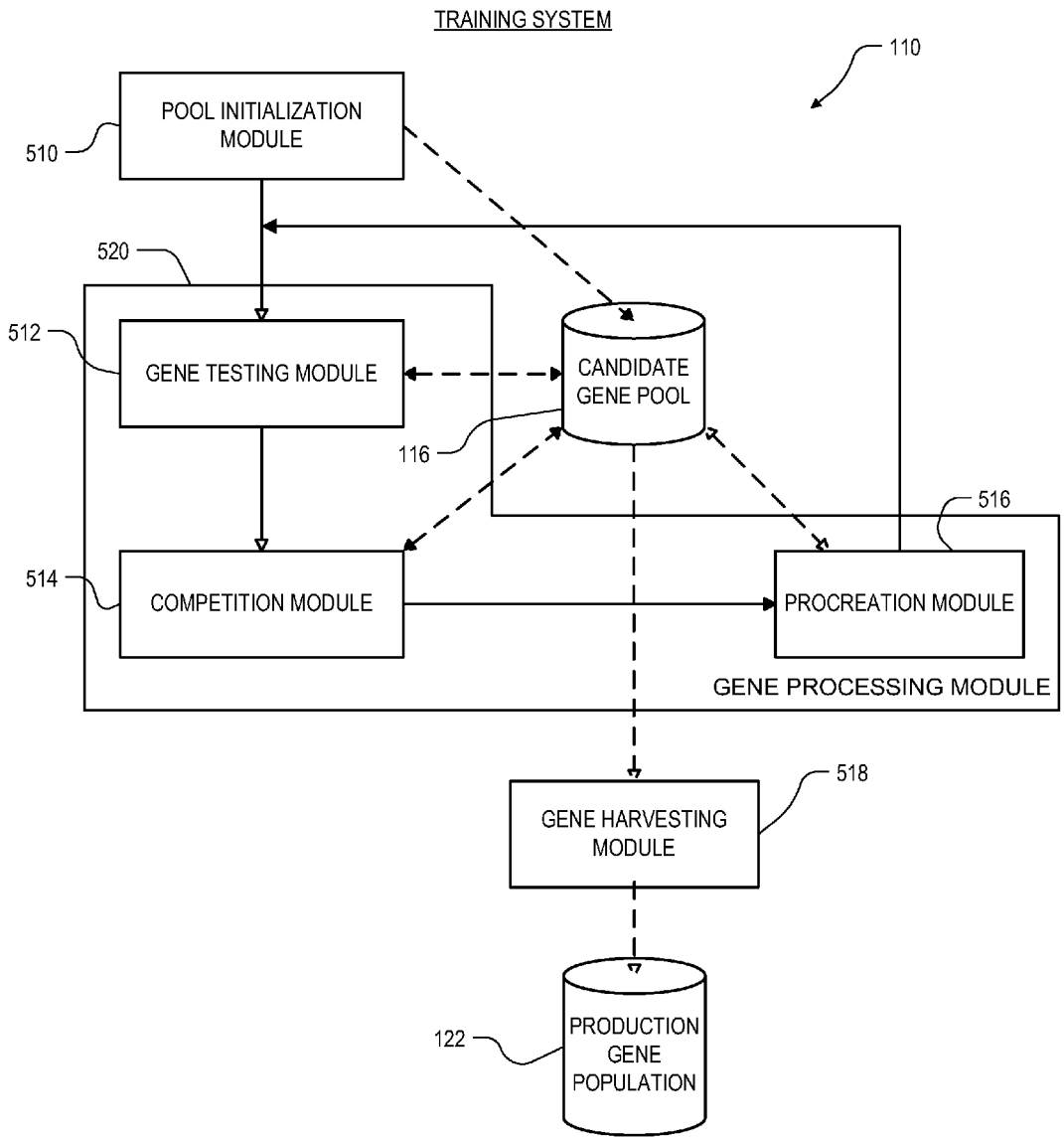
FIG. 5 illustrates modules that can be used to implement the functionality of the training system in FIG. 1.

FIG. 5 illustrates various modules that can be used to implement the functionality of training system 110 (FIG. 1). Candidate gene pool 116 and production gene population database 122 are also shown in the drawing. Solid lines indicate process flow, and broken lines indicate data flow. The modules can be implemented in hardware or software, and need not be divided up in precisely the same blocks as shown in FIG. 5. Some can also be implemented on different processors or computers, or spread among a number of different processors or computers. In addition, it will be appreciated that some of the modules can be combined, operated in parallel or in a different sequence than that shown in FIG. 5 without affecting the functions achieved. Also as used herein, the term "module" can include "sub-modules", which themselves can be considered herein to constitute modules. In particular, the gene testing module 512, competition module 514, and procreation module 516 are also considered herein to be sub-modules of a gene pool processor module 520. The blocks in FIG. 5 designated as modules can also be thought of as flowchart steps in a method.

Referring to FIG. 5, the candidate gene pool 116 is initialized by pool initialization module 510, which creates an initial set of candidate individuals in $L_0$ of the gene pool 116. These individuals can be created randomly, or in some embodiments a priori knowledge is used to seed the first generation. In another embodiment, individuals from prior runs can be borrowed to seed a new run. At the start, all individuals are active individuals, and are initialized with an experience level of zero and a fitness estimate that is undefined. Later on, the gene pool 116 can also include shadow individuals.

Gene testing module 512 then proceeds to test the population in the gene pool 116 on the training data 114. Only active individuals are tested. Also, for the reasons explained above, only those active individuals that have not yet reached the top layer $L_T$ of the elitist pool 118 (of which there are none initially) are tested. Each such individual undergoes a battery of tests or trials on the training data 114, each trial testing the individual on one sample 410. In one embodiment, each battery might consist of only a single trial. Preferably, however, a battery of tests is much larger, for example on the order of 1000 trials. In one embodiment, at least the initial battery of tests includes at least ExpMin($L_1$) trials for each individual, to enable the initial individuals to qualify for consideration for the first layer of the elitist pool 118. Note there is no requirement that all individuals undergo the same number of trials. After the tests, gene testing module 512 updates the fitness estimate associated with each of the individuals tested.

In an embodiment, the fitness estimate may be an average of the results of all trials of the individual. In this case the "fitness estimate" can conveniently be indicated by two numbers: the sum of the results of all trials of the individual, and the total number of trials that the individual has experienced. The latter number may already be maintained as the experience level of the individual. The fitness estimate at any particular time can then be calculated by dividing the sum of the results by the experience level of the individual. In an embodiment such as this, "updating" of the fitness estimate can involve merely adding the results of the most recent trials to the prior sum. In other embodiments, the results of each testing battery are combined into the prior fitness estimate in a manner that avoids any increased influence of test samples that may have been used more than once.

Next, competition module 514 updates the candidate pool 116 contents in dependence upon the updated fitness estimates. The operation of module 514 is described in more detail below, but briefly, the module considers individuals from lower layers for promotion into higher layers, discards individuals that do not meet the minimum individual fitness of their target layer, discards individuals that have been replaced in a layer by new entrants into that layer, and forms new shadow individuals from active individuals that have graduated successfully to a higher layer. Candidate gene pool 116 is updated with the revised contents.

After the candidate gene pool 116 has been updated, a procreation module 516 evolves a random subset of them. Only individuals in the elitist pool are permitted to procreate. Any conventional or future-developed technique can be used for procreation. In an embodiment, conditions, outputs, or rules from parent individuals are combined in various ways to form child individuals, and then, occasionally, they are mutated. The combination process for example may include crossover—i.e., exchanging conditions, outputs, or entire rules between parent individuals to form child individuals. New individuals created through procreation begin with an experience level of zero and with a fitness estimate that is undefined. These individuals are placed in $L_0$ of the gene pool 116. Preferably, after new individuals are created by combination and/or mutation, the parent individuals are retained. In this case the parent individuals also retain their experience level and fitness estimates, and remain in their then-current elitist pool layers. In another embodiment, the parent individuals are discarded. Shadow individuals do not participate in the procreation process.

After procreation, gene testing module 512 operates again on the updated gene pool 116. The process continues repeatedly.

Sometime after the top layer of elitist pool 118 is full, individuals can be harvested for use by production system 112. Gene harvesting module 518 retrieves active individuals for that purpose. In one embodiment, gene harvesting module 518 retrieves individuals periodically, whereas in another embodiment it retrieves individuals only in response to user input. Gene harvesting module 518 selects only from the top layer $L_T$, and can apply further selection criteria as well in order to choose desirable individuals. For example, it can select only the fittest individuals from $L_T$, and/or only those individuals that have shown low volatility. Other criteria will be apparent to the reader. The individuals also undergo further validation as part of this further selection criteria, by testing on historical data not part of training data 114. The individuals selected by the gene harvesting module 518 are written to the production gene population database 122 for use by production system 112 as previously described. The production gene population database 122 does not contain any shadow individuals.

As mentioned, competition module 514 manages the graduation of individuals from lower layers in the candidate gene pool 116, up to higher layers, and forms shadow individuals. This process can be thought of as occurring one individual at a time, as follows. In one embodiment, first, a loop is begun through all active individuals whose experience level has changed since the last time competition module 514 was executed. If the current individual's experience level has not increased sufficiently to qualify it for the next experience layer in the elitist pool 118, then the individual is ignored and the next one is considered. If the current individual's experience level has increased sufficiently to qualify it for a new experience layer, then the module 514 determines whether the target experience layer is already at quota. Both active and shadow individuals in the target experience layer count toward the quota. If the target experience layer is not already at quota, then the individual is simply moved into that experience level. If the target layer is full, then the competition module 514 determines whether the fitness estimate of the current individual exceeds that of the least fit individual (active or shadow) in the target layer. If so, then the least fit individual is discarded, and the current individual is moved up into the target layer. If not, then the current individual is discarded. Regardless of whether the current individual is discarded in this process, the competition module 514 also creates a new shadow individual in the current individual's former experience layer. The process then moves on to consider the next individual in sequence. Note that while individuals typically move up by only one experience layer at a time, that is not requirement in all embodiments. In some embodiments, such as in a client/server embodiment, it may happen that a particular individual is not considered for advancement within the elitist pool 118 until after its experience level has increased sufficiently for it to jump past one or more experienced layers. The new shadow individual may still be created in the current individual's former experience layer, which in this case may be two or more layers below the target layer.

In an embodiment that enforces an elitist pool minimum fitness, the step in which the fitness estimate of the current individual is compared to the minimum fitness of the target layer, can further include a test of whether the current individual's fitness estimate satisfies the elitist pool minimum fitness. Typically this latter test is applied only on individuals graduating out of level 0, but as mentioned previously, could be applied to individuals being considered for other layers in the elitist pool 118 as well. If the current individual does not satisfy the elitist pool minimum fitness, then it is discarded. Again, in a preferred embodiment a shadow individual may still be created in the current individual's former layer.

The above routine processes individuals sequentially, and different embodiments can implement different sequences for processing the individuals. Note that the processing sequence can affect the results.

Figure 6:
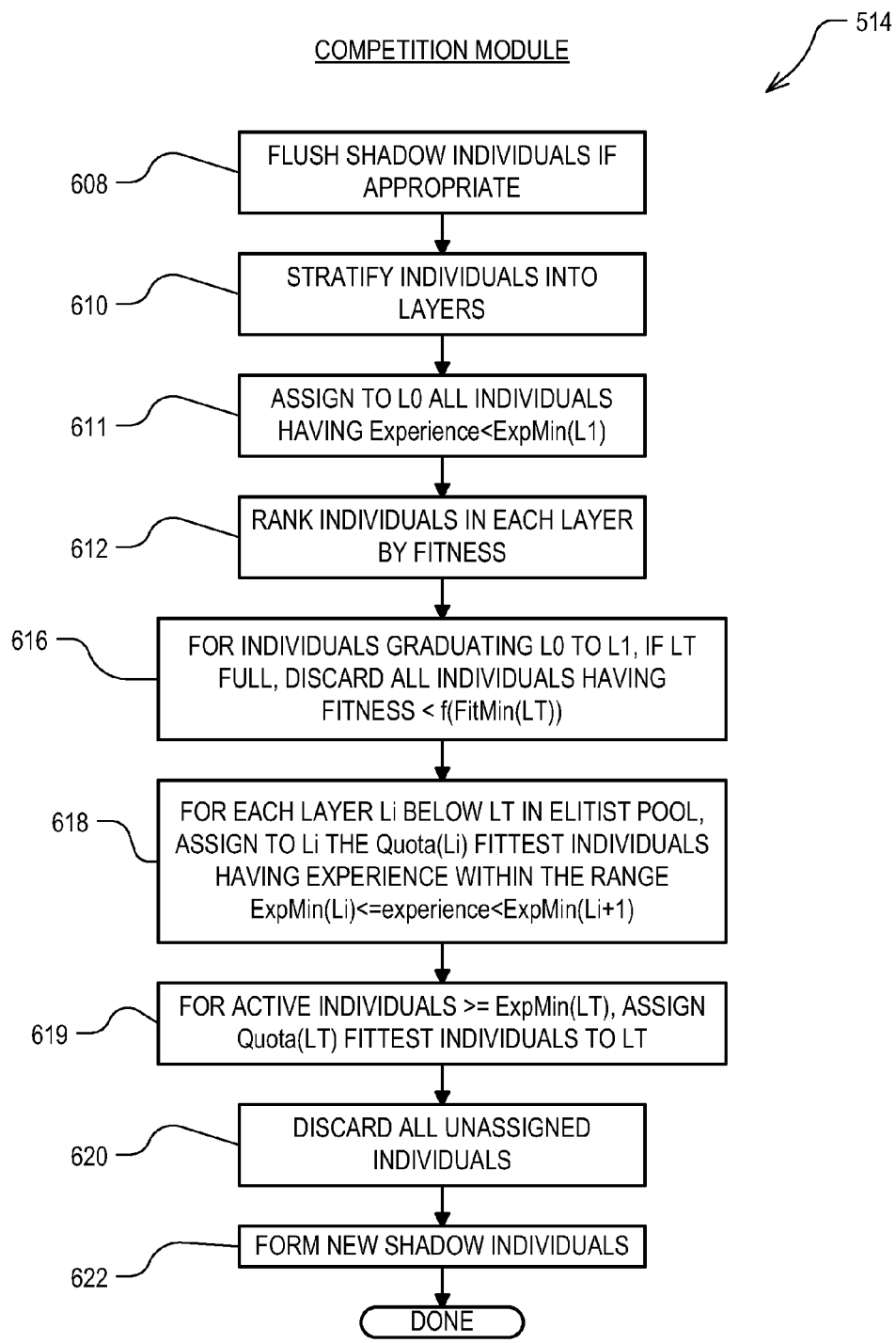
FIG. 6 illustrates a method of operation of the competition module in FIG. 5.

FIG. 6 is a flow chart which illustrates a bulk-oriented method of operation of competition module 514. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

In the embodiment of FIG. 6, the layers in the candidate gene pool 116 are disbanded and reconstituted each time the competition module 514 executes. These executions of competition module 514 are sometimes referred to herein as competition "events", and each comparison made between the fitness estimate of one individual and that of another is sometimes referred to herein as a comparison "instance".

In step 608, a flushing step is performed. The flushing step is described in more detail below, but briefly, if the number of shadow individuals in the elitist pool becomes too large, in step 608 they are all eliminated.

In step 610, all the individuals in candidate gene pool 116 are stratified into their experience layers. This includes both active and shadow individuals. In step 611, all individuals whose experience level is still within that of $L_0$, are assigned automatically to $L_0$. In step 612, within each experience layer $L_1$-$L_T$, the individuals are ranked according to their fitness estimates.

Step 616 implements the policy that once $L_T$ is full, no individuals are allowed into the elitist pool 118 unless they are at least as fit as some predetermined function f( ) of the top layer minimum fitness. Step 616 may be omitted in many embodiments because the use of shadow individuals tends to address a similar problem. In step 616, if $L_T$ is full, all individuals graduating from $L_0$ to $L_1$ whose fitness estimate is less than f(FitMin($L_T$)) are discarded. Variations of step 616 to implement variations of the elitist pool minimum fitness policy, will be apparent.

In step 618, for each layer $L_i$ below the top layer $L_T$, all the individuals in the elitist gene pool 118 (including both active and shadow individuals) having experience level within the range associated with layer $L_i$ are considered. Of these individuals, only the Quota($L_i$) fittest individuals are assigned to layer $L_i$. Note that some active individuals and some shadow individuals may well be left unassigned in this step. In step 619, of those individuals whose experience level is at least equal to the minimum experience level of the top layer of the elitist pool 118, the Quota($L_T$) fittest are assigned to $L_T$. This step can leave unassigned even some individuals with top layer experience, as individuals coming up from layer $L_{T-1}$ can supplant less fit individuals that were previously in $L_T$. Only active individuals can be excluded in step 619, however, because in the embodiment of FIG. 6 shadow individuals are never created in the top experience layer. In step 620, all individuals remaining in elitist gene pool 118 which were not assigned to specific layers in steps 611, 618 or 619, are discarded. Thus both active and shadow individuals can be discarded in step 620.

As used herein, a phrase such as "only the five fittest individuals", need not necessarily fill all five places. That is, if there are only three individuals to consider, the phrase is satisfied if all three individuals are assigned places. Thus it can be seen that step 618 includes both a policy that individuals entering a layer that is already at quota must compete for their place in that layer, as well as a policy that individuals entering a layer that is not yet full are promoted to that layer automatically. It can also be seen that steps 618 and 620 together implement a policy that fitness comparisons are made only among individuals having roughly the same experience.

In step 622, new shadow individuals are formed corresponding to each active individual that qualified for a new layer. This step can involve a loop through all active individuals that have newly entered a higher experience layer, and creating a corresponding shadow individual for each one. Other ways to accomplish this will be apparent to the reader. As previously described, each new shadow individual is associated with an indication of its experience layer, which is typically the experience layer of the corresponding active individual just prior to the battery of tests that qualified the active individual for its new experience layer. Each new shadow individual is also associated with an indication of a fitness estimate, typically also copied from the corresponding active individual from before the most recent battery of tests (i.e. its fitness estimate while it was in the same layer to which the shadow individual is assigned). Other variations, such as those previously described, also will be apparent to the reader.

In a typical embodiment, shadow individuals are formed from a particular active individual in each experience layer $L_0 \ldots L_{(T-1)}$ through which the active individual passes as it progresses upwards toward and into the top layer. Thus a particularly successful active individual may yield many shadow copies. In addition, in a typical embodiment, shadow individuals are not discarded in response to discarding of their corresponding active individual (though in another embodiment they can be). It can be seen that without control, the number of shadow individuals can grow to a point at which there are too many, thus extinguishing many potentially good active individuals through excess competition. In order to control this situation, the embodiment of FIG. 6 includes step 608, to flush shadow individuals in the event of certain circumstances. In one embodiment flushing occurs after every predetermined number of competition events. In another embodiment flushing occurs after every predetermined number of seconds or minutes. Preferably, however, shadow individuals are flushed in response to a determination that the number of active individuals has fallen below some predetermined threshold. For example flushing can take place in response to a determination that the number of active individuals has fallen below a predetermined percentage of the total number of individuals in the elitist pool. As another example flushing can take place in response to a determination that the number of active individuals has fallen below some number that depends on one or more of the layer quotas, such as half the quota of the top layer. On the other hand, once flushed, depending on the formulation of the flushing criteria, the number of active individuals may not immediately increase above the threshold. The step 608 therefore should also include a mechanism to avoid flushing repeatedly, on every competition event, while the number of active individuals remains below the threshold. This can be accomplished, for example, by preventing flushing if the number of shadow individuals is zero or is smaller than some other predetermined minimum number. In a preferred embodiment flushing is performed in response to a determination that the number of active individuals in the candidate gene pool 118 has fallen below half the quota of the top layer, while the number of shadow individuals in the candidate gene pool 118 is greater than some other predetermined minimum number.

In one embodiment, step 608 flushes all the shadow individuals in the candidate gene pool 118 when the determination is made to flush. In another embodiment, the determination can be made layer by layer, and if flushing criteria are met for a particular layer then all shadow individuals for only that layer are flushed. In yet another embodiment step 608 may perform partial flushing. Many other variations will be apparent to the reader.

Figure 7:
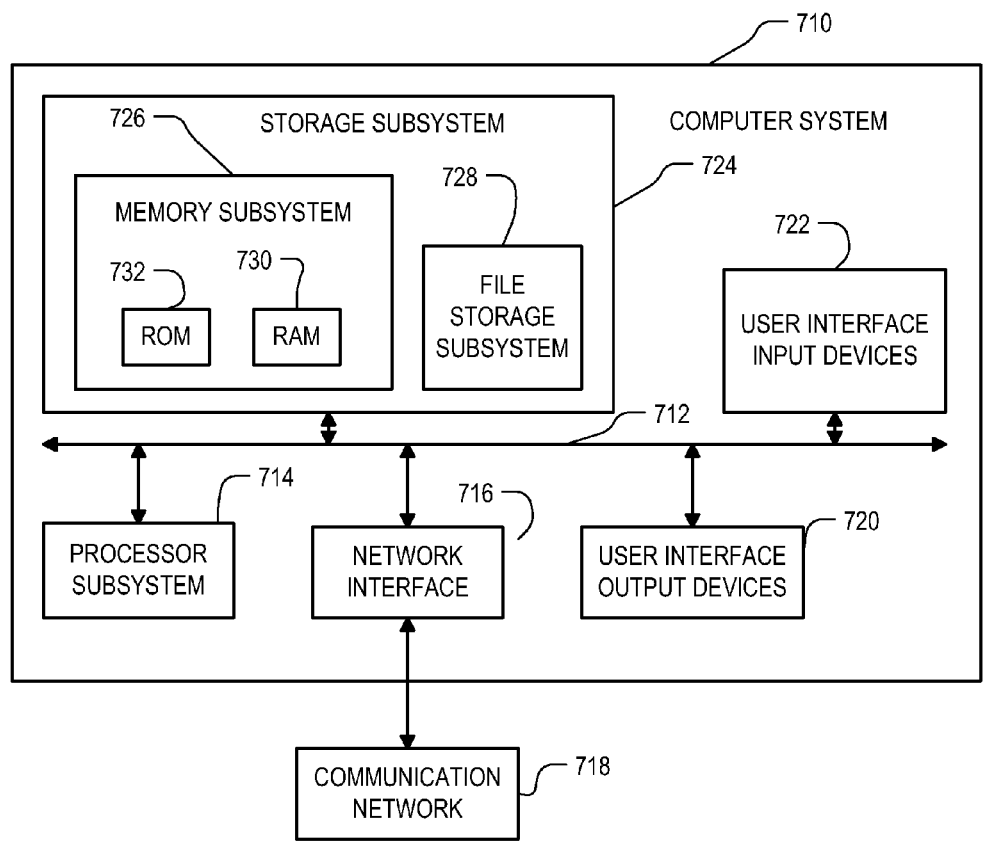
FIG. 7 is a simplified block diagram of a computer system that can be used to implement either or both of the training system or production system in FIG. 1, and/or the training server and clients in FIG. 8.

FIG. 7 is a simplified block diagram of a computer system 710 that can be used to implement training system 110, production system 126, or both. While FIGS. 1, 5, 6 and 9 indicate individual components for carrying out specified operations, it will be appreciated that each component actually causes a computer system such as 710 to operate in the specified manner.

Computer system 710 typically includes a processor subsystem 714 which communicates with a number of peripheral devices via bus subsystem 712. These peripheral devices may include a storage subsystem 724, comprising a memory subsystem 726 and a file storage subsystem 728, user interface input devices 722, user interface output devices 720, and a network interface subsystem 716. The input and output devices allow user interaction with computer system 710. Network interface subsystem 716 provides an interface to outside networks, including an interface to communication network 718, and is coupled via communication network 718 to corresponding interface devices in other computer systems. Communication network 718 may comprise many interconnected computer systems and communication links. These communication links may be wireline links, optical links, wireless links, or any other mechanisms for communication of information. While in one embodiment, communication network 718 is the Internet, in other embodiments, communication network 718 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 722 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 710 or onto computer network 718.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system. In particular, an output device of the computer system 710 on which production system 112 is implemented, may include a visual output informing a user of action recommendations made by the system, or may include a communication device for communicating action signals directly to the controlled system 128. Additionally or alternatively, the communication network 718 may communicate action signals to the controlled system 128. In the financial asset trading environment, for example, the communication network 718 transmits trading signals to a computer system in a brokerage house which attempts to execute the indicated trades.

Storage subsystem 724 stores the basic programming and data constructs that provide the functionality of certain embodiments of the present invention. For example, the various modules implementing the functionality of certain embodiments of the invention may be stored in storage subsystem 724. These software modules are generally executed by processor subsystem 714. Storage subsystem 724 also stores the candidate gene pool 116, the training database 114, and/or the production gene population 122. Alternatively, one or more of such databases can be physically located elsewhere, and made accessible to the computer system 710 via the communication network 718.

Memory subsystem 726 typically includes a number of memories including a main random access memory (RAM) 730 for storage of instructions and data during program execution and a read only memory (ROM) 732 in which fixed instructions are stored. File storage subsystem 728 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 728. The host memory 726 contains, among other things, computer instructions which, when executed by the processor subsystem 714, cause the computer system to operate or perform functions as described herein. As used herein, processes and software that are said to run in or on "the host" or "the computer", execute on the processor subsystem 714 in response to computer instructions and data in the host memory subsystem 726 including any other local or remote storage for such instructions and data.

Bus subsystem 712 provides a mechanism for letting the various components and subsystems of computer system 710 communicate with each other as intended. Although bus subsystem 712 is shown schematically as a single bus, alternative embodiments of the bus subsystem may use multiple busses.

Computer system 710 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 710 depicted in FIG. 7 is intended only as a specific example for purposes of illustrating the preferred embodiments of the present invention. Many other configurations of computer system 710 are possible having more or less components than the computer system depicted in FIG. 7.

Client/Server Embodiment

In some environments, the training data used to evaluate an individual's fitness can be voluminous. Therefore, even with modern high processing power and large memory capacity computers, achieving quality results within a reasonable time is often not feasible on a single machine. A large gene pool also requires a large memory and high processing power. In one embodiment, therefore, a client/server model is used to provide scaling in order to achieve high quality evaluation results within a reasonable time period. Scaling is carried out in two dimensions, namely in pool size as well as in evaluation of the same individual to generate a more diverse gene pool so as to increase the probability of finding fitter individuals. In the client/server embodiment, the gene pool is distributed over a multitude of clients for evaluation. Each client continues to evaluate its own client-centric gene pool using data from training database 114, which it may receive in bulk or periodically on a sustained and continuing basis. Individuals that satisfy one or more predefined conditions on a client computer are transmitted to the server to form part of a server-centric gene pool.

Distributed processing of individuals also may be used to increase the speed of evaluation of a given individual. To achieve this, individuals that are received by the server but have not yet been tested on a certain number of samples, or have not yet met one or more predefined conditions, may be sent back from the server to a multitude of clients for further evaluation. The evaluation result achieved by the clients (alternatively called herein as partial evaluation) for an individual is transferred back to the server. The server merges the partial evaluation results of an individual with that individual's fitness estimate at the time it was sent to the clients to arrive at an updated fitness estimate for that individual in the server-centric gene pool. For example, assume that an individual has been tested on 500 samples and is sent from the server to, for example, two clients each instructed to test the individual on 100 additional samples. Accordingly, each client further tests the individual on the additional 100 samples and reports its own client-centric fitness estimate to the server. The server combines these two estimates with the individual's fitness estimate at the time it was sent to the two clients to calculate an updated server-centric fitness estimate for the individual. The combined results represent the individual's fitness evaluated over 700 days. In other words, the distributed system, in accordance with this example, increases the experience level of an individual from 500 samples to 700 samples using only 100 different training samples at each client. A distributed system, in accordance with the present invention, is thus highly scalable in evaluating its individuals.

Advantageously, clients are enabled to perform individual procreation locally, thereby improving the quality of their individuals. Each client is a self-contained evolution device, not only evaluating the individuals in its own pool, but also creating a new generation of individuals and moving the evolutionary process forward locally. Thus clients maintain their own client-centric gene pool which need not match each other's or the server-centric gene pool. Since the clients continue to advance with their own local evolutionary process, their processing power is not wasted even if they are not in constant communication with the server. Once communication is reestablished with the server, clients can send in their fittest individuals to the server and receive additional individuals from the server for further testing.

Figure 8:
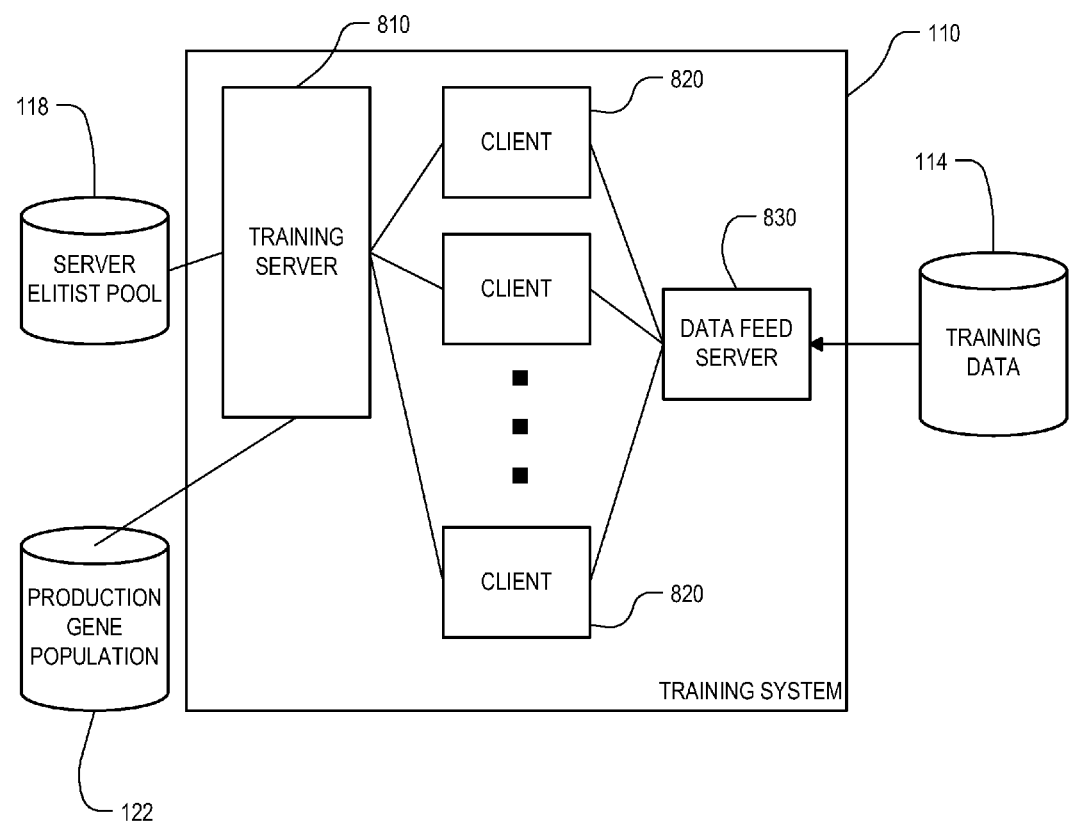
FIG. 8 is a high-level block diagram of an example embodiment of the training system of FIG. 1 using a network computing system.

FIG. 8 is a high-level block diagram of an example embodiment of training system 110 implemented using a network computing system. The training system 110 includes a plurality of client computers 820 (sometimes referred to herein simply as "clients") and a training server computer 810. Server 810 may itself be a central or a distributed server. A client computer 820 may be a laptop computer, a desktop computer, a cellular/VoIP handheld computer or smart phone, a tablet computer, distributed computer, or the like. An example system may have hundreds of thousands of clients. In an embodiment, the training server and/or each of the client computers can have the structure of FIG. 7, or any of its variations as described above. The client computers 820 communicate with the training sever 810 to receive individuals for testing, and to report tested individuals back to the training server 810. The training server 810 maintains a server-centric experience-layered elitist pool 118, but in an embodiment, does not maintain any candidate individuals below layer $L_1$ of the elitist pool. New individuals are created by clients, both during initialization and by procreation, and they are not reported to the training server 810 until they have been tested on sufficient numbers of samples to qualify for the server's elitist pool 118. The number of individuals created by the clients 820 may vary depending on the memory size and the CPU processing power of the client. For example, in one embodiment, a client may have 1000 individuals for evaluation. Each client computer 820 further has a communication port to access one or more data feed servers 830, which retrieve and forward training samples from the training database 114 to the client computers 820. Alternatively, although not shown, the training samples may be supplied from data feed server 830 to the clients 820 via the training server 810. In an embodiment, the training server 810 implements shadow individuals but the client computers 820 do not.

Figure 9:
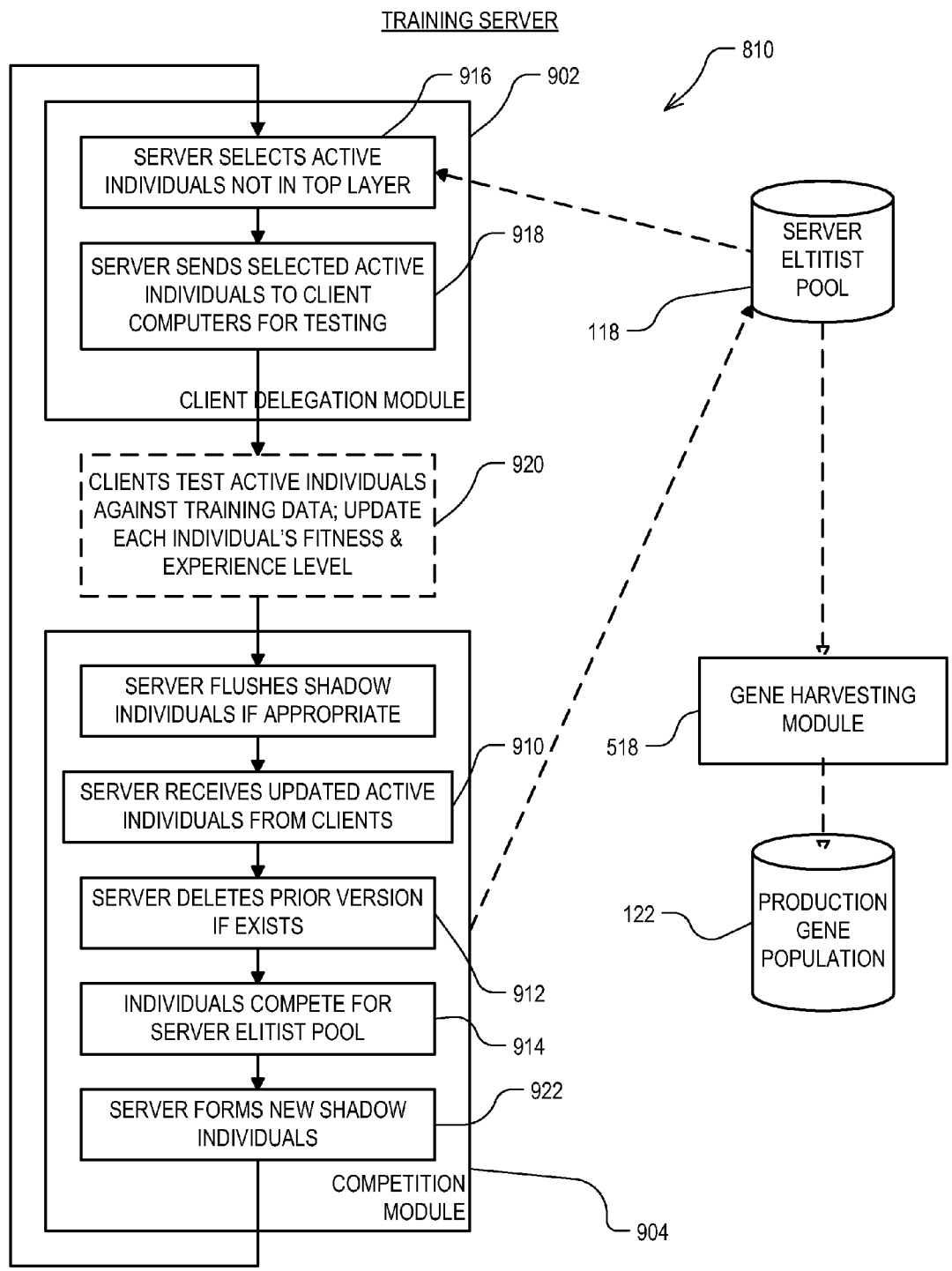
FIG. 9 illustrates modules that can be used to implement the functionality of training server of FIG. 8.

FIG. 9 illustrates various modules that can be used to implement the functionality of training server 810 (FIG. 8). Elitist pool 118 and production gene population database 122 are also shown in the drawing. As in the embodiment of FIG. 5, solid lines in FIG. 9 indicate process flow, and broken lines indicate data flow. The implementation variations mentioned above with respect to the embodiment of FIG. 5 apply to FIG. 9 as well.

In the operation of the client/server model, the training server 810 does not perform any testing or procreation itself. It does, however, enforce competition within its own server-centric elitist pool 118 when individuals are returned from clients. In particular, the server-centric elitist pool 118 includes both active and passive individuals as set forth above. FIG. 9 illustrates various modules that can be used to implement the functionality of training server 810. Like the embodiment of FIG. 5, the training server 810 includes a competition module 904. It also includes gene harvesting module 518, which may be same as in FIG. 5. It also includes gene testing and procreation functionality, but these are combined into a single client delegation module 902 in FIG. 9. The client delegation module 902 and the competition module 904 constitute two sub-modules in a gene pool processor module (not shown specifically in FIG. 9). The FIG. 9 embodiment does not include a pool initialization module in the sense of FIG. 5, since as mentioned, the clients initialize their own individual pools.

Referring to FIG. 9, in step 908, the competition module 904 flushes shadow individuals from the server-centric elitist pool 118 if appropriate. The same considerations and variations can be used in step 908 as are described above with respect to step 608. In step 910, the competition module 904 receives individuals from one or more of the client computers 820. If the embodiment is such that the client computers 820 implement shadow individuals, still only active individuals are received by the competition module 904 in FIG. 9. These individuals may arrive asynchronously, if and when client computers have them available to transmit. They may arrive out-of-order, and some individuals previously sent out for testing may never return. Individuals may arrive individually, or in bunches. At various times determined by competition module 904, after at least one individual has arrived, competition module 904 proceeds to step 912 to begin a competition "event".

In step 912, competition module 904 determines whether each incoming individual is a new one, or a return of an individual that the server previously sent out for testing. This determination can be made on the basis of individual IDs 312 (FIG. 3). If the latter, then the training server 810 replaces its prior copy of the individual with the one newly received. This step may involve merely updating the experience level and the fitness estimation of the prior copy of the individual in the server-centric elitist pool 118. In an embodiment, the prior copy of the individual is saved temporarily in case its testing experience level and fitness estimate are needed for the formation of a shadow copy. If in step 912, the competition module 904 determines that the incoming individual is a new one, then in step 914 the incoming individual competes for its position in the server elitist pool 118. The same rules of competition apply here as they do for the competition module 514 in the server-only model. That is, depending on the embodiment, the fitness estimate of the incoming individual may be compared to the least fit individual (active or shadow) in the now-appropriate experience layer for the incoming individual, and only the fitter of the two is retained. The other is discarded. An elitist pool minimum fitness policy can be applied here as well in some embodiments, based on a server-centric minimum fitness level. Alternatively, the entire server elitist pool 118 can be disbanded and reconstituted at each competition event, as described in more detail with respect to FIG. 6.

In step 922, the server 810 forms new shadow individuals corresponding to all active individuals that have newly qualified for a new layer in the server-centric elitist pool 118. In the embodiment, these will all be individuals that had been sent out for testing in step 920 and have now returned, so the version being replaced with the returned version can be used for the formation of the shadow copy. (Alternatively, that version can simply be marked as now being a shadow copy.) No shadow copy is created for individuals received in step 910 that are new individuals. The same considerations and variations can be used in step 922 as are described above with respect to step 622.

In the client delegation module 902, in step 916, the server 810 selects individuals from the server-centric elitist pool 118, and sends them out to one or more clients 820 for further testing (step 918). As in the server-only embodiment, the client delegation module 902 is restricted from selecting for further testing individuals already in the top layer of the elitist pool 118. Also, only active individuals are sent; shadow individuals are not further tested. In one embodiment, the battery of trials that an individual is to undergo is dictated by the training server. In such an embodiment, the server-centric view of the battery is the same as the client-centric view of the battery. In another embodiment, the battery of trials that an individual is to undergo is left to the client to decide, and client may perform more than one battery of trials on the individual before returning it to the server. In the latter embodiment, the client has its own client-centric view of a testing battery, and the server-centric view of the battery is unimportant.

In step 920 the client machines 820 test the individuals against training data from the data feed server 830, and update each individual's fitness and experience level locally. Step 920 is shown in broken lines in FIG. 9 because it is performed by clients rather than training server 810. At various subsequent times, the server 810 again receives back updated individuals from the clients in step 910, and repeats the process of FIG. 9.

The operation of the client computers 820 is the same as that previously described with respect to FIGS. 5 and 6, with the exception that individuals are provided both by the pool initialization module 510, as well as from the training server 810. In addition, preferably no shadow individuals are formed in the client computers 820. The candidate gene pool 116 in a client computer 820 is client-centric, and includes all candidate individuals being considered by the clients, including those that do not yet have sufficient experience to be considered for the elitist pool in the client computer. The candidate gene pool in the clients are layer-oriented as shown in FIG. 2, and for convenience, the layers in a client computer are sometimes designated herein with a top layer numbered CT rather than T, and with layers designated $CL_0$-$CL_{CT}$. None of the layer parameters in the client-centric gene pool, including the number of layers, need be the same as their corresponding parameters in other clients or in the server. Preferably the candidate gene pool 116 in the client computers 820 are implemented using linked lists, whereas the elitist pool 118 in the server 810 are implemented using a DBMS, both as previously described.

Unlike the single server embodiment, the gene testing module in the client computer 820 does not prevent further testing of individuals that have reached the top layer $CL_{CT}$ of the client-centric elitist pool 820. The gene harvesting module in a client computer 820 selects individuals only from the top layer $CL_{CT}$ of the client computer 820 for transmitting back to the server 810. Since the server 810 does not maintain any individuals that do not qualify for the server-centric elitist pool 118, the minimum experience level of the top layer $CL_{CT}$ in the client-centric elitist pool on each client computer 820 must be at least as high as the minimum experience level of the lowest layer $L_1$ of the elitist pool 118 of the training server 810. Preferably the minimum experience level of the top layer $CL_{CT}$ in the client-centric elitist pool on each client computer 820 is equal to the minimum experience level of the lowest layer $L_1$ of the elitist pool 118 of the training server 810.

Note that because of procreation on the client system 820, individuals may be sent up to the training server 810 which the training server 810 had never before seen. Such individuals are handled in step 914 (FIG. 9), by requiring them to compete for their position in the server-centric elitist pool 118 of the training server 810. Note further that because of competition in the client computer 820, some individuals that the training server 810 sent to the client computer 820 for further testing will never be returned to the training server 810. In this case the prior copy of the individual, retained by the training server 810, remains in place in the elitist pool 118 of the training server 810 unless and until it is displaced through competition in the training server 810 (step 914). Still further, note that an individual retained in the training server 810 after it has also been sent to a client 820 for further testing, may become displaced and deleted from the elitist pool 118 in the training server 810 through competition in the training server 810 (step 914). In this case, if the same individual is returned by the client computer 820, the training server 810 simply ignores it.

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section or the Cross References section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A computer-implemented data mining method, for use with a data mining training database containing training data, comprising the steps of:

providing a computer system having a memory having data identifying a plurality of gene database experience layers $L_1$-$L_T$ in an elitist pool, $T>1$, the layer $L_T$ being a top layer, each i'th one of the layers $L_1$-$L_{T-1}$ having associated therewith a respective distinct range of testing experience levels and a respective capacity $Quota(L_i)$, the top layer having associated therewith a minimum testing experience level which exceeds the testing experience levels of all the layers $L_1$-$L_{T-1}$;

providing in the memory a gene database identifying a plurality of individuals spread among at least one of the layers $L_1$-$L_T$, the individuals including active individuals and shadow individuals, each individual having associated therewith a fitness estimate and a testing experience level, and at least each active individual further identifying a plurality of conditions and at least one corresponding proposed output in dependence upon the conditions;

increasing the testing experience level of each active individual in a testing subset of at least one of the active individuals, including causing each active individual in the testing subset to undergo a respective battery of at least one trial, each trial applying the conditions of the respective individual to the training data to propose a result;

estimating a fitness for each individual in the testing subset in dependence upon the training data and the results proposed by the individual in the step of testing;

for each j'th one of the layers in the elitist pool, where $0<j<T$, the computer system discarding all individuals in the elitist pool which are not among the $Quota(L_j)$ fittest individuals in the j'th layer;

forming in a particular layer below the top layer, a particular shadow individual corresponding to a particular one of the active individuals in response to the testing experience level of the particular active individual increasing beyond the range of testing experience levels associated with the particular layer without having previously been discarded, the particular shadow individual being formed with a particular fitness estimate; and providing for deployment selected ones of the active individuals not discarded in the step of discarding.

2. The method of claim 1, wherein the particular active individual is discarded in the step of discarding, in response to the testing experience level of the particular active individual increasing beyond the range of testing experience levels associated with the particular layer.

3. The method of claim 1, wherein the memory further has data identifying a gene database experience layer $L_0$, the layer $L_0$ having associated therewith a range of testing experience levels below that of all the layers $L_1$-$L_T$, and wherein the particular active individual is not within the layer $L_0$ before or after the step of increasing the testing experience level.

4. A method according to claim 3, further comprising a procreation step of forming new active individuals in the layer $L_0$ at least in part by copying into each subject new active individual at least one member of the group consisting of: a condition in an individual in a set of parent individuals corresponding to the subject new individual, and an output in an individual in the set of parent individuals corresponding to the subject new individual, wherein the individuals in all the sets of parent individuals are active individuals.

5. The method of claim 1, wherein the top layer has associated therewith a gene capacity quota Quota($L_T$), further comprising a step of the computer system discarding all individuals in the top layer which are not among the Quota($L_T$) fittest individuals in the top layer.

6. The method of claim 1, wherein the step of forming a particular shadow individual includes assigning as the particular fitness estimate the fitness estimate that was associated with the particular active individual before the testing experience level of the particular active individual increased beyond the range of testing experience levels associated with the particular layer.

7. The method of claim 1, comprising:

forming in a given layer below the top layer, a given shadow individual corresponding to each given one of the active individuals whose testing experience level has increased beyond the range of testing experience levels associated with the given layer without having previously been discarded, in response to the testing experience level of the given active individual increasing beyond the range of testing experience levels associated with the given layer, the given shadow individuals each being formed with a respective fitness estimate; and wherein the step of discarding individuals includes a step of discarding at least one active individual and a step of discarding at least one shadow individual.

8. The method of claim 7, wherein the step of respective corresponding shadow individual includes assigning as the respective fitness estimate the fitness estimate that was associated with the corresponding active individual prior to the step of increasing the testing experience level.

9. The method of claim 7, further comprising the steps of:

making a first determination that the number of active individuals in the gene database is below a predetermined flushing threshold, and in response thereto, discarding at least one shadow individual in the gene database.

10. The method of claim 9, wherein the step of discarding at least one shadow individual comprises a step of discarding all shadow individuals in at least one of the layers.

11. The method of claim 9, wherein the step of discarding at least one shadow individual comprises a step of discarding all shadow individuals in the gene database.

12. The method of claim 9, further comprising the step of making a second determination that the number of shadow individuals in the gene database is above a predetermined minimum threshold, and wherein the step of discarding at least one shadow individual in the gene database is performed only in further response to the second determination.

13. The method of claim 1, further comprising the steps of:

at least as soon as the top layer $L_T$ of the elitist pool contains Quota($L_T$) individuals, establishing an elitist pool minimum fitness level; and after the elitist pool minimum fitness level has been established, discarding all individuals whose fitness estimate fails to satisfy the elitist pool minimum fitness level upon first consideration for the elitist pool.

14. A method according to claim 1, wherein the computer system comprises a server and a collection of at least one client device including a subject client device, wherein the step of increasing the testing experience level comprises the server delegating the battery of trials to the client devices, including the subject client device, further comprising the step of the server receiving back active individuals from the client devices, including the subject client device, each received active individual having associated therewith an indication of a respective client-centric fitness, wherein the step of estimating a fitness comprises the steps of:

the subject client device estimating a client-centric fitness value for a subject one of the individuals the testing of which was delegated to the subject client device, and associating the client-centric fitness value with the subject individual; and the server updating a server-centric fitness value for active individuals received back from the client devices, including the subject individual received back from the subject client device, before the step of discarding.

15. A system for data mining, for use with a data mining training database containing training data, the system comprising:

a memory; and a data processor coupled to the memory, the memory having data identifying a plurality of gene database experience layers $L_1$-$L_T$ in an elitist pool, T>1, the layer $L_T$ being a top layer, each i'th one of the layers $L_1$-$L_{T-1}$ having associated therewith a respective distinct range of testing experience levels and a respective capacity Quota($L_i$), the top layer having associated therewith a minimum testing experience level which exceeds the testing experience levels of all the layers $L_1$-$L_{T-1}$, the memory further having a gene database identifying a plurality of individuals spread among at least one of the layers $L_1$-$L_T$, the individuals including active individuals and shadow individuals, each individual having associated therewith a fitness estimate and a testing experience level, and at least each active individual further identifying a plurality of conditions and at least one corresponding proposed output in dependence upon the conditions;

the data processor configured to:

increase the testing experience level of each active individual in a testing subset of at least one of the active individuals, including causing each active individual in the testing subset to undergo a respective battery of at least one trial, each trial applying the conditions of the respective individual to the training data to propose a result;

estimate a fitness for each individual in the testing subset in dependence upon the training data and the results proposed by the individual in the step of testing;

for each j'th one of the layers in the elitist pool, where 0<j<T, discard all individuals in the elitist pool which are not among the Quota($L_j$) fittest individuals in the j'th layer;

form in a particular layer below the top layer, a particular shadow individual corresponding to a particular one of the active individuals in response to the testing experience level of the particular active individual increasing beyond the range of testing experience levels associated with the particular layer without having previously been discarded, the particular shadow individual being formed with a particular fitness estimate; and provide for deployment selected ones of the active individuals not discarded in the step of discarding.

16. The system of claim 15, wherein the data processor configured further to discard the particular active individual in the step of discarding, in response to the testing experience level of the particular active individual increasing beyond the range of testing experience levels associated with the particular layer.

17. The system of claim 15, wherein the memory further has data identifying a gene database experience layer $L_0$, the layer $L_0$ having associated therewith a range of testing experience levels below that of all the layers $L_1$-$L_T$, and wherein the data processor configured to perform the step of discarding only for active individuals which are not within the layer $L_0$ before or after the step of increasing the testing experience level.

18. A system according to claim 17, wherein the data processor configured further to perform a procreation step of forming new active individuals in the layer $L_0$ at least in part by copying into each subject new active individual at least one member of the group consisting of: a condition in an individual in a set of parent individuals corresponding to the subject new individual, and an output in an individual in the set of parent individuals corresponding to the subject new individual, wherein the data processor configured to perform the procreation step only with parent individuals which are active individuals.

19. The system of claim 15, wherein the top layer has associated therewith a gene capacity quota Quota($L_T$), wherein the data processor is configured further to discard all individuals in the top layer which are not among the Quota($L_T$) fittest individuals in the top layer.

20. The system of claim 15, wherein forming a particular shadow individual includes assigning as the particular fitness estimate the fitness estimate that was associated with the particular active individual before the testing experience level of the particular active individual increased beyond the range of testing experience levels associated with the particular layer.

21. The system of claim 15, wherein the data processor is configured further to form in a given layer below the top layer, a given shadow individual corresponding to each given one of the active individuals whose testing experience level has increased beyond the range of testing experience levels associated with the given layer without having previously been discarded, in response to the testing experience level of the given active individual increasing beyond the range of testing experience levels associated with the given layer, the given shadow individuals each being formed with a respective fitness estimate, wherein the step of discarding individuals includes a step of discarding at least one active individual and a step of discarding at least one shadow individual.

22. The system of claim 21, wherein the fitness estimate assigned to each given shadow individual is the fitness estimate that was associated with the corresponding active individual before the testing experience level of the given active individual increased beyond the range of testing experience levels associated with the given layer.

23. The system of claim 21, wherein the data processor is configured further to:

make a first determination that the number of active individuals in the gene database is below a predetermined flushing threshold; and in response thereto, and in response thereto, discard at least one shadow individual in the gene database.

24. The system of claim 23, wherein discarding at least one shadow individual includes discarding all shadow individuals in at least one of the layers.

25. The system of claim 23, wherein discarding at least one shadow individual includes discarding all shadow individuals in the gene database.

26. The system of claim 23, wherein the data processor is configured further to make a second determination that the number of shadow individuals in the gene database is above a predetermined minimum threshold, and wherein the data processor is configured to perform the discarding of at least one shadow individual in the gene database only in further response to the second determination.

27. The system of claim 23, wherein the data processor is configured further to:

at least as soon as the top layer $L_T$ of the elitist pool contains Quota($L_T$) individuals, establish an elitist pool minimum fitness level; and after the elitist pool minimum fitness level has been established, discard all individuals whose fitness estimate fails to satisfy the elitist pool minimum fitness level upon first consideration for the elitist pool.

28. A system according to claim 15, wherein the data processor comprises a server and a collection of at least one client device including a subject client device, wherein the data processor is configured further to perform the step of increasing the testing experience level by the server delegating the battery of trials to the client devices, including the subject client device, wherein the server is configured further to receive back active individuals from the client devices, including the subject client device, each received active individual having associated therewith an indication of a respective client-centric fitness, wherein the data processor is configured to perform the step of estimating a fitness by:

the subject client device estimating a client-centric fitness value for a subject one of the individuals the testing of which was delegated to the subject client device, and associating the client-centric fitness value with the subject individual; and the server updating a server-centric fitness value for active individuals received back from the client devices, including the subject individual received back from the subject client device, before the step of discarding.

* * * * *

UNITED STATES PATENT AND TRADEMARK OFFICE
CERTIFICATE OF CORRECTION

PATENT NO. : 9,256,837 B1
APPLICATION NO. : 13/830278
DATED : February 9, 2016
INVENTOR(S) : Babak Hodjat et al.

It is certified that error appears in the above-identified patent and that said Letters Patent is hereby corrected as shown below:

At column 26, claim 23, line 8, after "response thereto," delete "and in";

At column 26, claim 23, line 9, delete "response thereto,".

Signed and Sealed this
Tenth Day of May, 2016

Michelle K. Lee
*Director of the United States Patent and Trademark Office*